(12) United States Patent
Zurek et al.

(10) Patent No.: US 7,580,540 B2
(45) Date of Patent: Aug. 25, 2009

(54) APPARATUS AND METHOD FOR RECEIVING INPUTS FROM A USER

(75) Inventors: Robert A. Zurek, Antioch, IL (US); Simone Koo, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 832 days.

(21) Appl. No.: 11/025,718

(22) Filed: Dec. 29, 2004

(65) Prior Publication Data

US 2006/0140422 A1   Jun. 29, 2006

(51) Int. Cl.
H04R 25/00   (2006.01)
H04R 17/02   (2006.01)
H04M 1/00   (2006.01)

(52) U.S. Cl. .................. 381/380; 381/151; 381/367; 455/575.6

(58) Field of Classification Search .......... 381/364, 381/381, 99, 151, 173, 327, 361, 380, 367; 455/521, 575.2, 575.6
See application file for complete search history.

(56) References Cited

U.S. PATENT DOCUMENTS

| 2,045,404 | A | * | 6/1936 | Nicholides | ................. 381/151 |
| 4,520,238 | A | | 5/1985 | Ikeda | |
| 6,094,492 | A | | 7/2000 | Boesen | |
| 6,349,001 | B1 | | 2/2002 | Spitzer | |
| 7,295,676 | B2 | * | 11/2007 | Chalupper | ................. 381/313 |
| 2002/0021407 | A1 | | 2/2002 | Elliott | |
| 2003/0002705 | A1 | * | 1/2003 | Boesen | ................. 381/380 |
| 2004/0169620 | A1 | | 9/2004 | Baram | |
| 2005/0286734 | A1 | * | 12/2005 | Wang | ................. 381/381 |

FOREIGN PATENT DOCUMENTS

| GB | 2396905 A | 7/2004 |
| WO | 9500860 A | 1/1995 |
| WO | 0128195 A1 | 4/2001 |
| WO | WO 2004/012477 A2 | 2/2004 |

OTHER PUBLICATIONS

Manabu Ishihara & Jun Shirataki, "Applying Multi-Level Sliced Speech Signals to Bone-Conducted Communication", IEEE Int'l Symposium on Circuits and Systems, May 23, 2005, pp. 2735-2738.

(Continued)

*Primary Examiner*—Curtis Kuntz
*Assistant Examiner*—Jesse A Elbin
(74) *Attorney, Agent, or Firm*—Sylvia Chen (57) ABSTRACT

An apparatus (300) and method (500) for receiving inputs from a user (102) is provided. The inputs from the user may be head gestures and/or speech of the user. The head gestures refer to movements of the head of the user. The apparatus includes an accelerometer (303) for receiving inputs from the user. The inputs are in form of nasal bone vibrations of the user, which are caused by the head gestures and/or speech of the user. The accelerometer further generates signals corresponding to the inputs received from the user.

22 Claims, 4 Drawing Sheets

OTHER PUBLICATIONS

Aini Hussain, Farizah Saharil, Rahmat Hidayat Mokri & Burhanuddin Yeop Majlis, "On the Use of MEMS Accelerometer to Detect Fatigue", IEEE Int'l Conference on Semiconductor Electronics, Dec. 9, 2004, pp. 631-635.

"Low-Cost ± 2 g Dual-Axis Accelerometer with Duty Cycle Output", Analog Devices, Inc., 2000, 12 pages.

"Santoprene B100 bondable TPV Sticks to plastics NOT to molds", Advanced Elastomer Systems, L.P., 2001, 16 pages.

"EE 7382 Introduction to MEMS", Dr. J-B. Lee, Mar. 16, 2004, 10 pages.

* cited by examiner

APPARATUS AND METHOD FOR RECEIVING INPUTS FROM A USER

FIELD OF THE INVENTION

This invention relates in general to electronic devices, and more specifically to an apparatus and method for receiving inputs from a user.

BACKGROUND

Various apparatuses and methods are known in the art that communicate inputs from a user to an electronic device when the user is engaged in other activities, such as driving, cycling and riding a motorcycle. These apparatuses, commonly called hands-free headsets, can be mounted on a user's ear, enabling the user to simultaneously communicate with the electronic device and perform other activities. These headsets can be wired to the electronic device or communicate wirelessly using a link such as Bluetooth.

BRIEF DESCRIPTION OF THE DRAWINGS

The accompanying figures, where like reference numerals refer to identical or functionally similar elements throughout the separate views, and which, together with the detailed description below, are incorporated in and form a part of the specification, serve to further illustrate various embodiments and explain various principles and advantages, in accordance with the invention.

DETAILED DESCRIPTION

Various embodiments of the invention provide an apparatus and method for receiving inputs from a user. The apparatus includes an accelerometer that receives inputs from the user in form of nasal bone vibrations of the user. The nasal bone vibrations of the user may be caused by head gestures and/or speech of the user. Head gestures generally refer to the head movements of the user. The accelerometer further generates signals corresponding to the inputs received from the user.

This disclosure is provided to further explain in an enabling fashion the best modes of making and using various embodiments in accordance with the invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the invention, further discussion of such software and ICs, if any, will be limited to the essentials with respect to the principles and concepts within the preferred embodiments.

Figure 1:
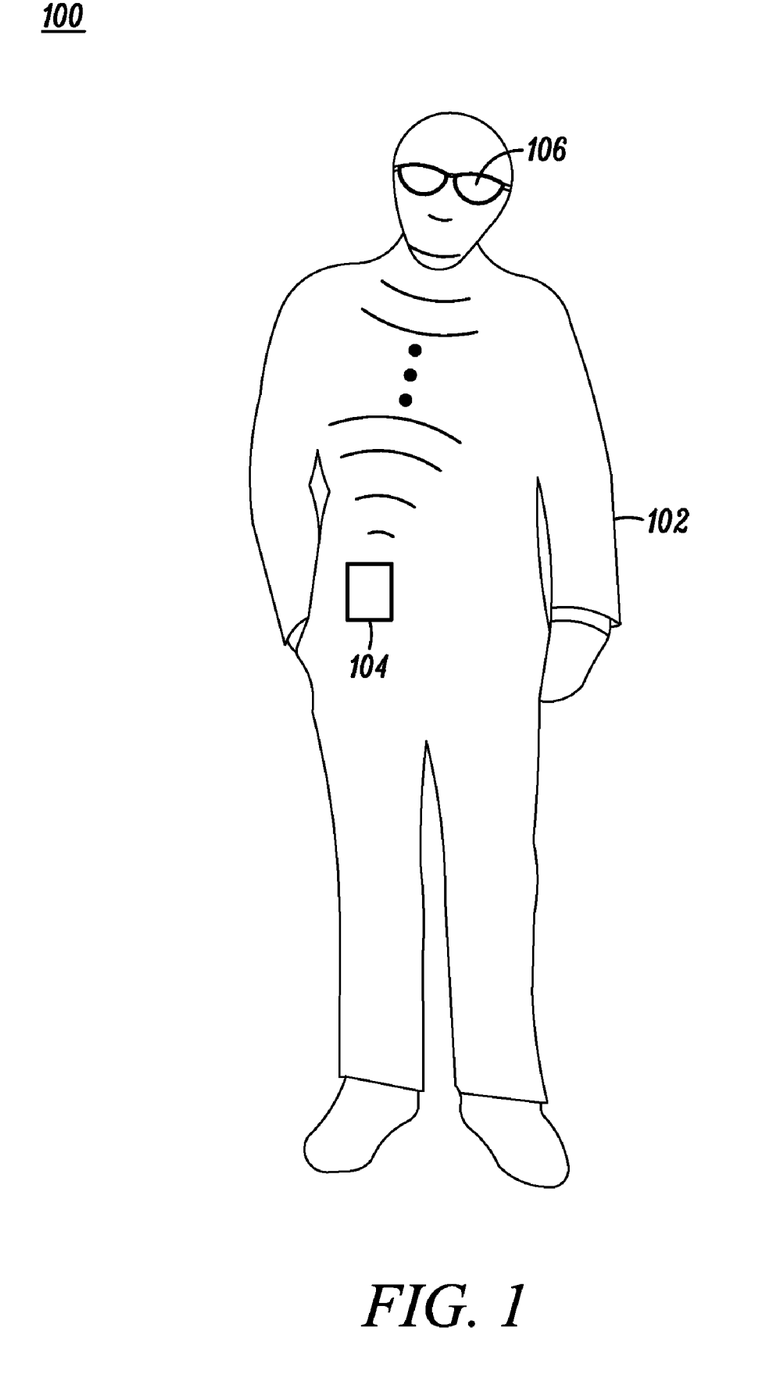
FIG. 1 illustrates an operational environment of various embodiments in accordance with the invention.

FIG. 1 illustrates an operational environment 100 of various embodiments in accordance with the invention. The operational environment 100 includes a user 102, an electronic device 104, and a nose-mounted-input-device 106. The user 102 communicates with the electronic device 104 to control the electronic device 104. Further, the user 102 may simultaneously communicate with the electronic device 104 and perform other activities such as driving, cycling and riding a motorcycle by means of an apparatus mounted on the nose-mounted-input-device 106 worn by the user 102. In an embodiment of the invention, the nose-mounted-input-device 106 may be a pair of eyeglasses as shown in FIG. 1. In another embodiment of the invention, the nose-mounted-input-device 106 may be for example, a pince nez, an adhesive-mounted strip, a nose clip, nose plugs, a dive mask, or a pilot's oxygen mask.

In various embodiments of the invention, the electronic device 104 may be a communication device and so forth. Further, the communication device may be a mobile device or a telephone device with a graphical user interface.

Figure 2:
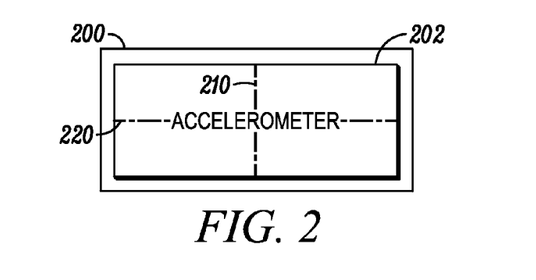
FIG. 2 shows an apparatus for receiving inputs from a user, in accordance with an embodiment of the invention.

FIG. 2 shows an apparatus 200 for receiving inputs from the user 102, in accordance with an embodiment of the invention. The apparatus 200 includes an accelerometer 202. The accelerometer 202 receives inputs from the user 102 and generates signals corresponding to the inputs received from the user 102. The inputs from the user 102 are in the form of nasal bone vibrations of the user 102. The nasal bone is an elongated rectangular bone that forms the bridge of the nose. When the user 102 speaks or moves his/her head, the nasal bone vibrates. Further, a thin dermal layer on the bridge of the nose aids in the transfer of vibratory energy. Nasal bone vibrations are caused by the speech or head gestures of the user 102. The vibrations caused by the head gestures are different from those caused by the speech of the user 102. In the case of head gestures, the accelerometer 202 acquires the acceleration of the head of the user 102 and the nose-mounted-input-device 106, whereas in the case of the speech, the accelerometer 202 acquires the vibrations of the nasal bone.

Exemplary head gestures may be the user 102 nodding his/her head to give an input to the electronic device 104, jerking his/her head to provide another input to the electronic device 104, or shaking his/her head to provide yet another input to the electronic device 104. Head gesture may further be used to control functions of the electronic device 104 such as navigating a user interface on the electronic device 104, scrolling through a menu, answering a call (if the electronic device 104 is a wireless telephone), toggling on and off a feature of the electronic device 104, and the like.

In an embodiment of the invention, the accelerometer 202 is mounted on the nose-mounted-input-device 106. An accelerometer generally refers to a device that measures the acceleration of vibrations of a physical device. The accelerometer includes a seismic mass mounted inside a casing. The movement of the seismic mass inside the casing is proportional to the force of acceleration on the physical device. In various embodiments of the invention, accelerometer 202 may be a piezoelectric accelerometer, a capacitive accelerometer, a laser-based accelerometer, a strain-based accelerometer, or any other type of accelerometer that may electronically acquire the acceleration of the head and the nasal bone. In case of the piezoelectric accelerometers, the acceleration acting on the seismic mass develops a force on a piezoelectric quartz or a ceramic crystal. The force causes a strain on the crystals proportional to the acceleration and the piezoelectric accelerometer generate signals corresponding to the acceleration. In this embodiment of the invention, the accelerometer 202 measures the acceleration of vibrations of the nose-mounted-input-device 106. The vibrations of the nose-mounted-input-device 106 may be caused by the nasal bone vibrations of the user 102, vibrations occurring due to the head movement of the user 102, vibrations caused by jostling of the nose-mounted-input-device 106 on the head, vibrations occurring due to objects striking the nose-mounted-input-device 106, and/or other external disturbances.

In an embodiment of the invention, the accelerometer 202 may be a Micro-Electro Mechanical System (MEMS) accelerometer. The MEMS accelerometer includes a first axis 210 and a second axis 220. The first axis 210 and the second axis 220 of the MEMS accelerometer are orthogonally placed with respect to each other, so that the first axis 210 may be sensitive to nasal bone vibrations caused by the speech and/or horizontal head movement of the user 102. Further, the second axis 220 may be sensitive to nasal bone vibrations caused by the speech and/or vertical head movement of the user 102. As a result, the apparatus 200 may receive nasal bone vibrations caused by the horizontal and vertical head movement of the user 102 as well as nasal bone vibrations caused by the speech. In an exemplary embodiment of the invention, the accelerometer 202 may be an ADXL202E dual-axis accelerometer manufactured by Analog Devices Inc.

Figure 3:
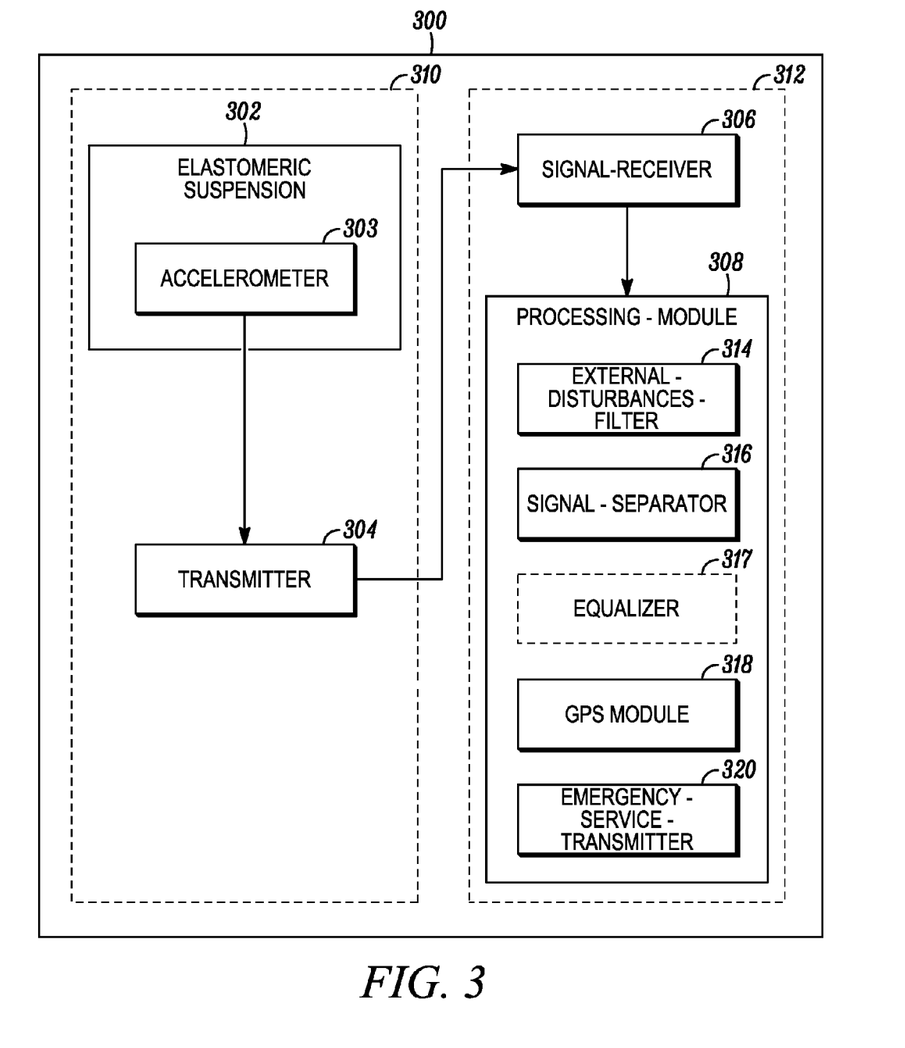
FIG. 3 shows an apparatus for communicating inputs from a user to an electronic device, in accordance with an embodiment of the invention.

FIG. 3 shows the apparatus 300 for communicating inputs from the user 102 to the electronic device 104, in accordance with an embodiment of the invention. The apparatus 300 further includes an elastomeric suspension 302, a transmitter 304, a signal-receiver 306 and a processing-module 308.

The elastomeric suspension 302 dampens vibrations resulting from movement of the nose-mounted-input-device 106 relative to a user's head caused by, for example, jostling of the nose-mounted-input-device 106 on the head while the user is jogging or objects striking the nose-mounted-input-device 106. The elastomeric suspension 302 is mounted on at least one nose pad of the nose-mounted-input-device 106. This mounting is further shown in FIG. 4.

Exemplary materials suitable for the elastomeric suspension 302 may be thermoplastic materials, molding materials, or other dampening materials. In an embodiment of the invention, the material suitable for the elastomeric suspension 302 is a Santoprene® B100 bondable TPV. Santoprene® is a registered trademark of Advanced Elastomer Systems. In another embodiment of the invention, the material suitable for the elastomeric suspension 302 is a foam, such as CONFOR® foam. In a third embodiment of the invention, the material suitable for the elastomeric suspension 302 is one of an ISODAMP® C-1000 Series highly dampened thermoplastic vinyl, an ISOLOSS® HD urethane elastomer, an ISOLOSS® VL viscoelastic compound, or a VersaDamp® V-2000 thermoplastic rubber material. CONFOR®, ISODAMP®, ISOLOSS® and VersaDamp® are trademarks licensed to the Aearo Company.

In various embodiments of the invention, the accelerometer 303 is mounted on the elastomeric suspension 302. Since, the nose pad is in close contact with the bridge of the nose, the accelerometer 303 receives the nasal bone vibrations that are closest to the speech in tone quality.

The details of the transmitter 304 are provided hereinafter. The transmitter 304 transmits the signals (i.e., signals generated by the accelerometer 303) to the electronic device 104. The transmitter 304 is mounted on the nose-mounted-input-device 106 and is connected to the electronic device 104 through a wired or wireless connection. In an embodiment of the invention, the electronic device 104 and the transmitter 304 are Bluetooth®-enabled, and the transmitter 304 transmits the signals to the electronic device 104 through Bluetooth®. Bluetooth® is a registered trademark of Bluetooth Special Interest Group (SIG). In another embodiment, the transmitter 304 may transmit the signals to the electronic device 104 through a non-secure form of Radio Frequency (RF) transmission such as Amplitude Modulation (AM) or Frequency Modulation (FM). In yet another embodiment, the transmitter 304 may transmit the signals to the electronic device 104 through an infrared or ultrasonic transmission.

Further, the accelerometer 303, the elastomeric suspension 302 and the transmitter 304 may together be referred to as an input-device-side 310 of the apparatus 300 as they are mounted on the nose-mounted-input-device 106. Similarly, the signal-receiver 306 and the processing-module 308 may together be referred to as an electronic-device-side 312 of the apparatus 300 as they reside on the electronic device 104 in this embodiment. In an alternate embodiment, the processing-module 308 may be mounted on the nose-mounted-input-device 106.

The details of the signal-receiver 306 are provided hereinafter. The signal-receiver 306 receives the signals transmitted by the transmitter 304. In an embodiment, the signal-receiver 306 resides on the electronic device 104. In an embodiment, the signal-receiver 306 may be Bluetooth®-enabled. In another embodiment of the invention, the signal-receiver 306 may have a wired connection with the transmitter 304.

The details of the processing-module 308 are provided hereinafter. The processing-module 308 processes the signals received by the signal-receiver 306 to provide an input to the electronic device 104.

In various embodiments of the invention, the processing-module 308 may be a filter, an Application-Specific Integrated Circuit (ASIC) or a microprocessor of the electronic device 104. The processing-module 308 resides on the electronic device 104. As stated previously, in another embodiment, the processing-module 308 may be mounted on the nose-mounted-input-device 106.

In the embodiment shown, the processing-module 308 includes an external-disturbances-filter 314, a signal-separator 316, and optionally an equalizer 317.

The details of the external-disturbances-filter 314 are provided hereinafter. The external-disturbances-filter 314 filters the signals received by the signal-receiver 306 for external disturbances. External disturbances are due to movement of the nose-mounted-input-device 106 relative to the user's head. External disturbances may be caused by the movement of the user 102, for example, when the user 102 is performing other activities. For example, when the user 102 is riding a motorcycle, the vibrations of a moving motorcycle may cause the nose-mounted-input-device 106 to "bounce" on the user's head and create an external disturbance. As another example, when the user 102 is riding a motorcycle, pebbles striking the nose-mounted-input-device 106 may create an external disturbance. In various embodiments, the external-disturbances-filter 314 may filter signals with a frequency greater than a predefined frequency. The external-disturbances-filter 314 may function as a frequency filter or as a temporal process associated with pre-specified attack and release times.

In another embodiment, the external-disturbances-filter 314 filters the signals received by the signal-receiver 306 to identify and remove signals caused by the vibrations occurring due to the movement of the nose-mounted-input-device 106 relative to the user's head and objects striking the nose-mounted-input-device 106. For example, a signal caused by placing the nose-mounted-input-device 106 on a table or floor should be filtered out by the external-disturbances-filter 314 rather than be interpreted as an input signal to the electronic device 104.

The signals caused by the vibrations occurring due to the movement of the nose-mounted-input-device 106 relative to the user's head and objects striking the nose-mounted-input-device 106 are hereinafter referred to as impact signals. If the external-disturbances-filter 314 identifies a gradient greater than a predetermined gradient in the filtered signals, it is assumed that the gradient is caused by an impact signal, and is thereafter removed by the external-disturbances-filter 314.

In this embodiment, the external-disturbances-filter 314 resides in the processing-module 308. In another embodiment, the external-disturbances-filter 314 may be an ASIC embedded on the processor of the electronic device 104. In yet another embodiment, the external-disturbances-filter 314 may be mounted on the nose-mounted-input-device 106.

The details of the signal-separator 316 are provided hereinafter. The signal-separator 316 separates the signals received by the signal-receiver 306 into high-band and low-band signals. In this embodiment, the signal-separator 316 separates the signals filtered by the external-disturbances-filter 314 into high-band and low-band signals.

In this embodiment, the high-band signals are characteristic of the nasal bone vibrations caused by the speech of the user 102. The low-band signals are characteristic of accelerations that are caused by the head gestures of the user 102. In this embodiment, the high-band signals may be in a frequency range of 300 Hz to 4000 Hz, and the low-band signals may be in a frequency range of 0.1 Hz to 200 Hz.

In various embodiments, the equalizer 317 resides in the processing module 308. The equalizer 317 performs some frequency response equalization on the high-band signals to correct the frequency response function of the signals picked up through the nasal bone of the user 102 to make it more like the frequency response of speech as spoken through the user's mouth.

In this embodiment, the signal-separator 316 resides in the processing-module 308. In another embodiment, the signal-separator 316 may be an ASIC, a signal processing function in a microprocessor or a dedicated digital signal processor of the electronic device 104. In yet another embodiment, the signal-separator 316 may be a discrete component filter network on the electronic device 104. In another embodiment, the signal-separator 316 may be mounted on the nose-mounted-input-device 106.

In various embodiments, the processing-module 308 further includes a Global Positioning System (GPS) module 318 and an emergency-service-transmitter 320. The GPS module 318 senses the cessation of geographic movement of the user 102. The emergency-service-transmitter 320 is used to notify emergency services, based on impact signals that have an amplitude greater than a predetermined level (identified by the external-disturbances-filter 314) combined with a cessation (sensed by the GPS module 318) of the geographic movement of the user 102. For example, if the user 102 falls/crashes, the emergency-service-transmitter 320 may notify an emergency service, if an impact signal is identified for a time period, and during the subsequent time period the GPS module 318 determines no change in co-ordinates of the user 102. The emergency-service-transmitter 320 could be a transmitter used solely for this purpose, or could be a wireless transmitter in the electronic device 104 which is used to connect the electronic device 104 to a communication network, such as in a wireless phone.

Figure 4:
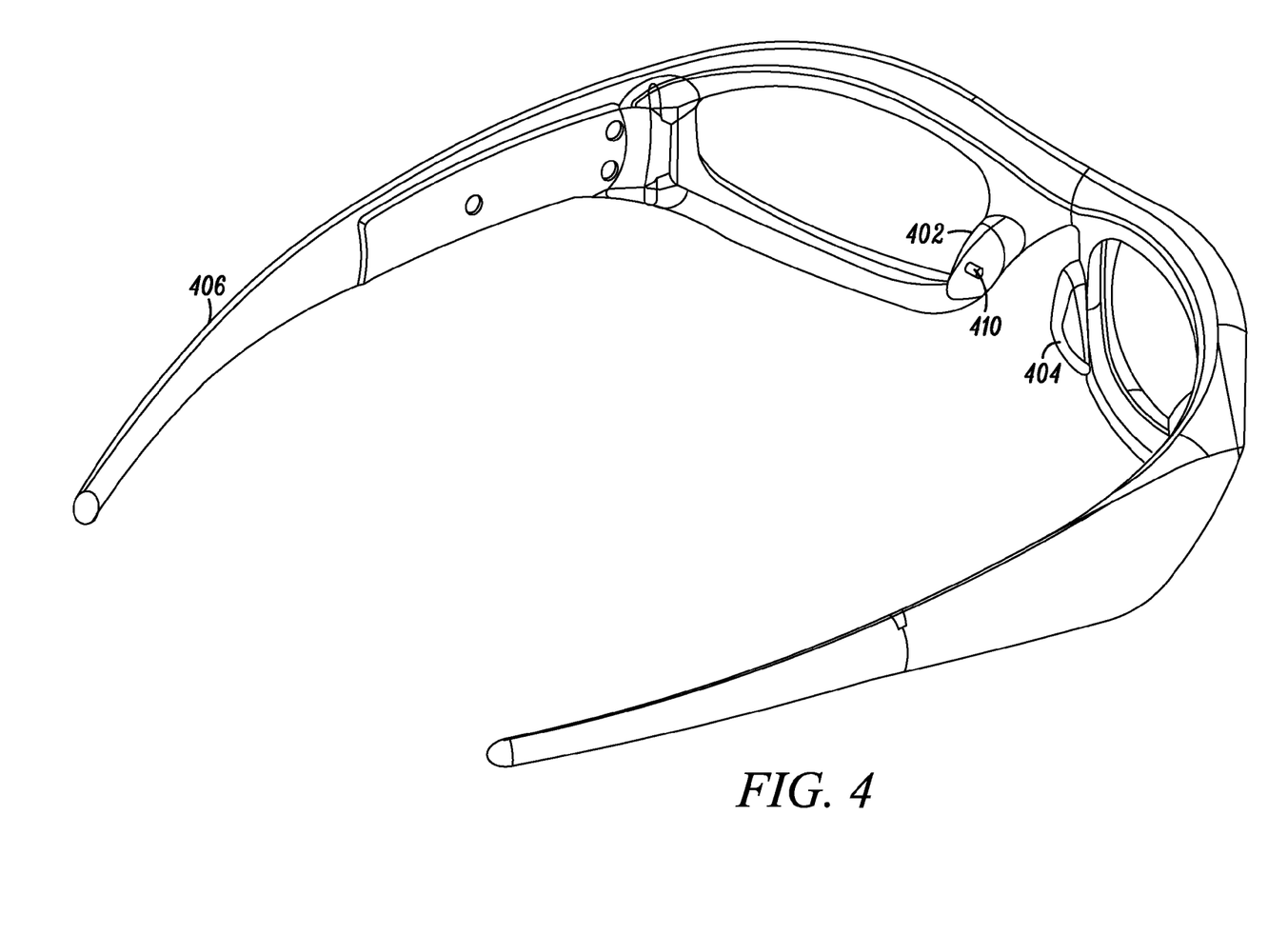
FIG. 4 shows an input-device-side of the apparatus, as shown in FIG. 3, mounted on a nose-mounted-input-device, in accordance with an embodiment of the invention.

FIG. 4 shows an input-device-side apparatus 410, mounted on a pair of eyeglasses 406, in accordance with an embodiment of the invention. The input-device-side apparatus 410 is analogous to the input-device-side 310 shown in FIG. 3. The eyeglasses 406 are a particular implementation of the nose-mounted input device 106 shown in FIG. 1. The pair of eyeglasses 406 includes a first nose pad 402 and a second nose pad 404. When the user 102 wears the pair of eyeglasses 406, the first nose pad 402 and the second nose pad 404 are in close contact with the bridge of the nose of the user 102. The input-device-side apparatus 410 may be mounted on either the first nose pad 402, the second nose pad 404, or on both of them. In another embodiment, the input-device-side apparatus 410 may be mounted on a similar region that contacts the bridge of the nose of the user 102. In this embodiment, the input-device-side apparatus 410 is mounted on the first nose pad 402, as shown in FIG. 4.

Figure 5:
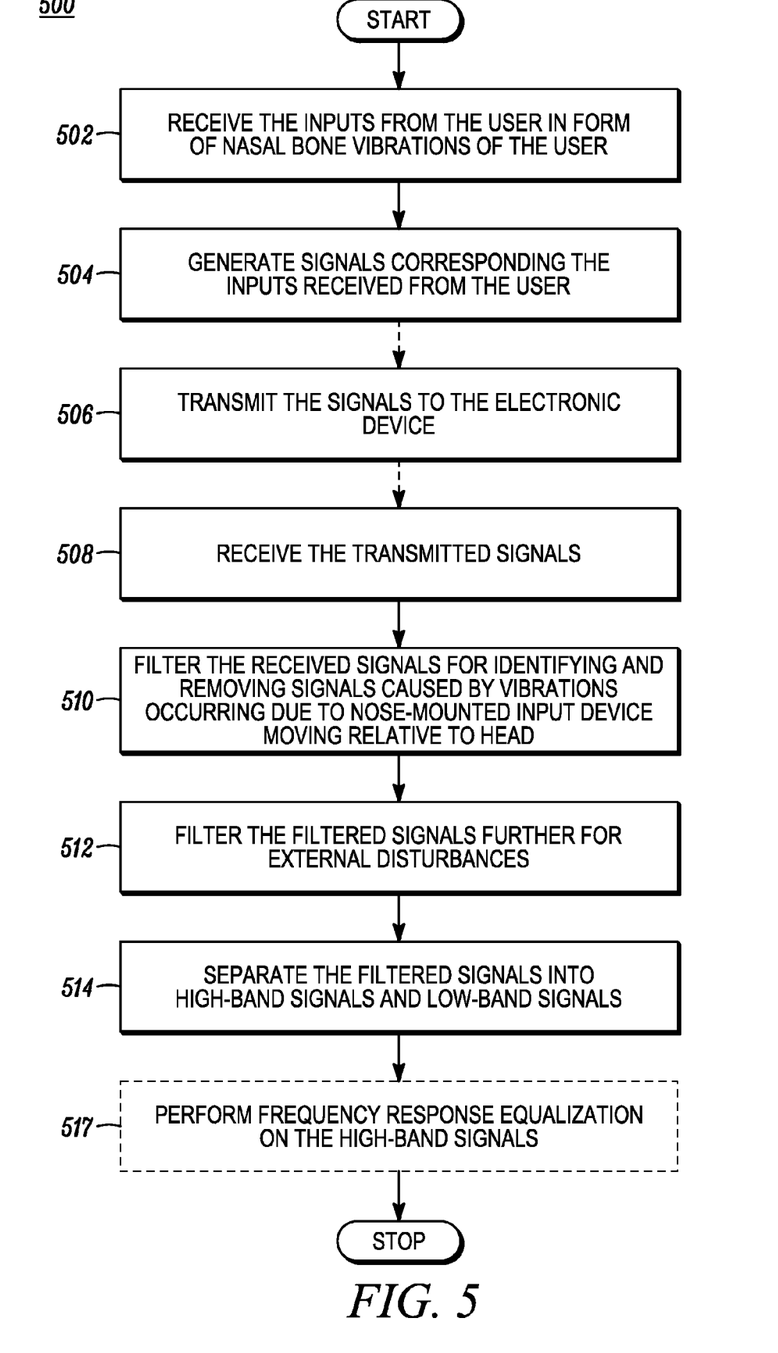
FIG. 5 is a flowchart illustrating a method for receiving inputs from a user, in accordance with an embodiment of the invention.

FIG. 5 shows a flowchart of a method 500 for receiving inputs from the user 102, in accordance with an embodiment of the invention.

At step 502, inputs are received in form of the nasal bone vibrations of the user 102. The step 502 is performed by an accelerometer such as accelerometer 202 in FIG. 2 or accelerometer 303 in FIG. 3. At step 504, signals are generated corresponding to the inputs received from the user 102. The step 504 is performed by the accelerometer 202, 303.

In various embodiments, the signals are transmitted to the electronic device 104, at step 506. The step 506 is performed by the transmitter 304. The signals transmitted by the transmitter 304 are received by the signal-receiver 306, at step 508.

At step 510, the signals received by the signal-receiver 306 are filtered for identifying and removing signals caused by the vibrations occurring due to the nose-mounted-input-device 106 moving relative to the user's head. The step of 510 is performed by the external-disturbances-filter 314. The filtered signals are then further filtered, at step 512, for the external disturbances. The step 512 is also performed by the external-disturbances-filter 314.

The signals filtered by the external-disturbances-filter 314 are separated into high-band and low-band signals, at step 514. The step of separating is performed by the signal-separator 316. In this embodiment, the high-band signals are characteristic of the nasal bone vibrations caused by the speech of the user 102. The low-band signals are characteristic of accelerations that are caused by the head gestures of the user 102. In various embodiments, some frequency response equalization may be performed on the high-band signals 517 to correct the frequency response function of the signal picked up through the nasal bone to make it more like speech spoken through the mouth of the user 102. The step of equalizing is performed by the equalizer 317.

In an embodiment, the external-disturbances-filter 314 may use the emergency-service-transmitter 320 to notify emergency services based on the identified impact signals that have an amplitude greater than the predetermined level and cessation of the geographical movement of the user 102.

Therefore, it should be clear from the preceding disclosure that the invention provides an apparatus and method that communicates inputs from the user to the electronic device in a user-friendly manner, while the user is engaged in other activities such as cycling and riding a motorcycle. The apparatus and method advantageously receives input from the user in form of nasal bone vibrations that are caused by the speech and head gestures of the user. Picking up nasal bone vibration reduces audio noise caused by wind, which further improves the intelligibility of speech picked up by the apparatus, since the noise of the wind is significantly reduced. The apparatus and method may be further used advantageously to notify emergency services, if the electronic device is GPS-enabled.

The apparatus further advantageously includes a MEMS accelerometer. This significantly reduces the prerequisite processing capability of the apparatus. Further, the MEMS accelerometer has two axes that receive the nasal bone vibrations that may be caused by both the horizontal and vertical head movements of the user.

The apparatus may advantageously be used as a cellular accessory device or to enable a voice/gesture-controlled stopwatch/trip computer. The voice-/gesture-controlled stopwatch/trip computer may be installed on a mobile device to utilize its timing and location, and perform stopwatch/trip computer functions. The apparatus may be further used advantageously for providing control and other inputs from a user to a video game.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. An apparatus for receiving inputs from a user, the apparatus comprising:
    an input device with an accelerometer, the accelerometer adapted to receive the inputs in form of nasal bone vibrations of the user, the nasal bone vibrations being caused by head gestures and speech of the user, the accelerometer adapted to generate signals corresponding to the head gestures and speech;
    a transmitter for transmitting the signals generated by the accelerometer to an electronic device;
    an electronic device with a signal receiver for receiving the signals transmitted by the transmitter; and
    a signal-separator, for separating the signals received by the signal-receiver into high-band signals and low-band signals, the high-band signals being characteristic of the nasal bone vibrations caused by the speech of the user, the low-band signals being characteristic of accelerations caused by the head gestures of the user.

2. The apparatus of claim 1, wherein the accelerometer is mounted on a nose-mounted-input-device worn by the user.

3. The apparatus of claim 2, wherein the nose-mounted-input-device is in a form of a pair of eyeglasses.

4. The apparatus of claim 1, wherein the transmitter is mounted on the nose-mounted-input-device.

5. The apparatus of claim 1, further comprising:
    a processing-module residing on the electronic device, for processing the signals received by the signal-receiver providing an input to the electronic device.

6. The apparatus of claim 5, wherein the processing-module comprises:
    an external-disturbances-filter, for filtering the signals received by the signal-receiver for external disturbances caused by movement of the nose-mounted-input-device relative to the user.

7. The apparatus of claim 1, wherein the high-band signals are in a frequency range greater than 300 Hz.

8. The apparatus of claim 1, wherein the frequency range is lower than 4000 Hz.

9. The apparatus of claim 1, wherein the low-band signals are in a frequency range less than 200 Hz.

10. The apparatus of claim 9, wherein the frequency range is greater than 0.1 Hz.

11. The apparatus of claim 1, wherein the processing-module performs frequency response equalization on the high-band signals to correct a frequency response function of the signals received by the signal-receiver.

12. The apparatus of claim 5, wherein the processing-module further comprises:
    a Global Positioning System (GPS) module, for sensing cessation of geographic movement; and
    an emergency-service-transmitter, for notifying emergency services identified by the processing-module.

13. The apparatus of claim 1, wherein the head gestures are used to navigate through a user interface on the electronic device.

14. The apparatus of claim 1, wherein the accelerometer is a piezoelectric accelerometer.

15. The apparatus of claim 1, wherein the accelerometer is a Micro-Electro Mechanical System (MEMS) accelerometer.

16. The apparatus of claim 15, wherein the MEMS accelerometer includes a first axis and a second axis, the first axis and the second axis being orthogonally placed with respect to each other, the first axis being sensitive to the nasal bone vibrations caused by at least one of the speech and a horizontal head movement of the user, the second axis being sensitive to the nasal bone vibrations caused by at least one of the speech and a vertical head movement of the user.

17. The apparatus of claim 1, further comprising:
    an elastomeric suspension mounting the accelerometer.

18. The apparatus of claim 17, wherein the elastomeric suspension is mounted on at least one nose pad of a nose-mounted-input-device.

19. A method for receiving inputs from a user, the method comprising:
    receiving nasal bone vibrations of the user, the nasal bone vibrations being caused by head gestures and speech of the user;
    generating signals corresponding to the nasal bone vibrations received from the user;
    transmitting the generated signals to an electronic device;
    filtering the generated signals to identify and remove signals caused by vibrations occurring due to movement of a nose-mounted-input-device relative to the user; and separating the filtered signals into high-band signals and low-band signals, the high-band signals being characteristic of the nasal bone vibrations caused by the speech of the user, the low-band signals being characteristic of accelerations that are caused by the head gestures of the user.

20. The method of claim 19, further comprising:
receiving the transmitted signals at the electronic device.

21. The method of claim 19, further comprising performing frequency response equalization on the high-band signals to correct a frequency response function of the generated signals.

22. The method of claim 19, further comprising notifying for emergency services based on the generated signals.

* * * * *